United States Patent Office
3,838,096
Patented Sept. 24, 1974

3,838,096
GLASS FIBER-REINFORCED PLASTICS AND
PROCESS FOR PRODUCING THE SAME
Takeshi Nagasawa, Katsumasa Kuroiwa, Kouichi Narita, Reiko Hashimoto, and Kohji Tamaki, Koriyama, Japan, assignors to Nitto Boseki Co., Ltd., Fukushima-shi, Japan
Filed Dec. 6, 1971, Ser. No. 205,129
Int. Cl. C08g 51/04
U.S. Cl. 260—40 R    13 Claims

ABSTRACT OF THE DISCLOSURE

A glass fiber-reinforced plastic which comprises a glass fiber, an unsaturated polyester resin and a novel reaction product of a polybutadiene having a 1,2-structure content of about 50 mole percent to substantially 100 mole percent with a mercapto-organosilane represented by the general formula,

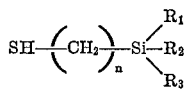

Figure 1:
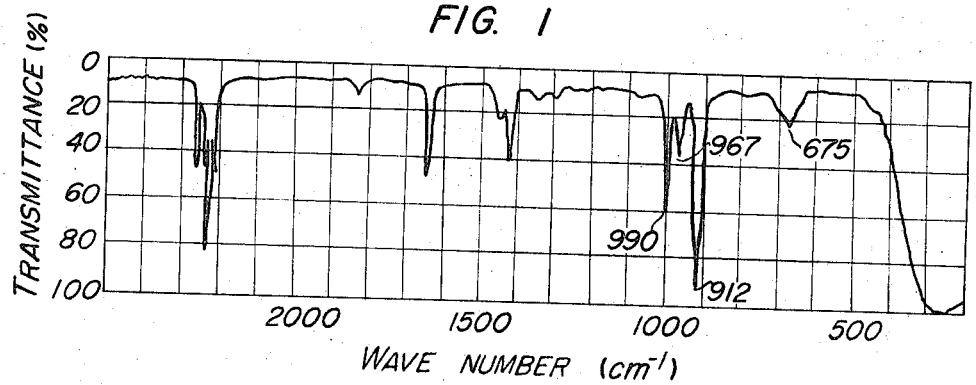

wherein $R_1$, $R_2$ and $R_3$, which may be same or different, are individually a hydrolyzable group capable of reacting with glass fiber, selected, for example, from the group consisting of alkoxy groups, acetoxy groups and halogens; and $n$ is an integer of 1 to 4, said reaction product being present at the interface between said glass fiber and said resin, and said resin being cured. In this plastic, the adhesion between the glass fiber and the unsaturated polyester resin is greatly improved, by the above-mentioned reaction product present at the interface between said two materials.

---

This invention relates to a glass fiber-reinforced plastic improved in adhesion between glass fiber and unsaturated polyester resin and to a process for producing the same. More particularly, the invention pertains to a glass fiber reinforced plastic improved in adhesion between glass fiber and unsaturated polyester resin by disposing at the interface between said two materials a novel reaction product of a polybutadiene having a high 1,2-structure content as defined hereinafter with a mercapto-organosilane represented by the general formula,

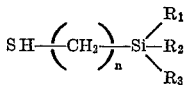

wherein $R_1$, $R_2$ and $R_3$, which may be same or different, are individually a hydrolyzable group capable of reacting with glass fiber, and n is an integer of 1 to 4.

Heretofore, various surface treating agents have been applied to inorganic materials in order to enhance the bonding of the inorganic materials to the organic materials. Particularly in the glass fiber industry, such surface treating agents have played important roles in the field of glass fiber-reinforced plastics, which are combinations of glass fibers with thermosetting resins.

As surface treating agents for application to glass fibers in the reinforced plastics industry, there have conventionally been used compounds which have silicon or chromium atoms as nuclei and which contain both of functional groups capable of easily reacting with glass surfaces and functional groups capable of easily reacting with resins, and it has been believed that these compounds have formed chemical primary bonds to glass surfaces and resins.

In such surface treating agents, the functional groups capable of easily bonding to glass are hydrolyzable halogens and alkoxy and acetoxy groups, and the functional groups capable of easily bonding to resins are vinyl, acryl, allyl, acryloxy, epoxy and amino groups. The vinyl and acryl groups are, of course, used to bring about vinyl-polymerization due to their unsaturated bonds. Typical examples of such surface treating agents include vinyl trichlorosilane, vinyl trimethoxyethoxysilane, methacryl-oxypropyl triethoxysilane, glycidoxypropyl triethoxysilane, γ-aminopropyl triethoxysilane and methacrylate chromic chloride.

In contrast to the prior art compounds mentioned above, the compound used in the present invention is a high molecular weight compound in which a silicon compound having a group capable of reacting with glass is bonded in the form of a pendant to a polybutadiene chain. By use of such a high molecular weight compound, the present inventors have been able to greatly improve the adhesion of an unsaturated polyester resin to a glass fiber, thereby obtaining an excellent glass fiber-reinforced plastic.

An object of the present invention is to provide a glass fiber-reinforced plastic improved in adhesion of the glass fiber to the resin.

Another object of the invention is to provide a glass fiber-reinforced plastic comprising a glass fiber and an unsaturated polyester resin, characterized in that a high molecular weight compound, in which a silicon compound having a group capable of reacting with glass is disposed at the interface between said glass fiber and said unsaturated polyester.

Other objects and advantages of the invention will become apparent from the following description.

In accordance with the present invention, there is provided a glass fiber-reinforced, cured, unsaturated polyester resin which comprises a glass fiber, an unsaturated polyester resin and a novel reaction product of a polybutadiene having a high 1,2-structure content with a mercapto-organosilane represented by the general formula,

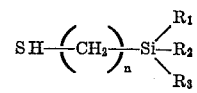

wherein $R_1$, $R_2$ and $R_3$, which may be same or different, are individually a hydrolyzable group capable of reacting with glass fiber, for example, alkoxy group, acetoxy group or halogen, and n is an integer of 1 to 4, said reaction product being present at the interface between said glass fiber and said resin. The groups used as $R_1$, $R_2$ and $R_3$ in the above-mentioned formula are those which have been well-known in the conventional glass fiber surface treatment as functional groups capable of being hydrolyzed to form primary bonds to glass fiber. These $R_1$, $R_2$ and $R_3$ may be same or different but, from the standpoint of synthesis of the compound, they are preferably the same, in general. As the alkoxy groups, there are used lower alkoxy groups having 1 to 3 carbon atoms, and as the halogens, there are preferably used chlorine, bromine and iodine. Examples of the compound represented by the aforesaid general formula include mercaptomethyl-trimethoxysilane, β - mercaptoethyl - trimethoxysilane, β-mercaptoethyl-triethoxysilane, β-mercaptoethyl-tripropyl-oxysilane, β-mercaptoethyl-trichlorosilane, β-mercapto-ethyl-tribromosilane, γ-mercaptopropyl-trimethoxysilane, γ-mercaptopropyl-triethoxysilane, γ-mercaptopropyl - trimethoxyethoxysilane, γ-mercaptopropyl-triacetoxysilane, γ-mercaptopropyl-trichlorosilane, γ - mercaptopropyl - tri-iodosilane, and δ-mercaptobutyl-triethoxysilane.

The term "polybutadiene having a high 1,2- structure content" used herein means a polybutadiene containing about 50 mole percent to substantially 100 mole percent of 1,2-structure, i.e. a polybutadiene containing about 50 mole percent to substantially 100 mole percent of butadiene monomer units having a vinyl group in the form of a pendant. The polybutadiene used in the present invention has a degree of polymerization of 4 to about 100.

As is well known, a conjugated 1,3-butadiene is polymerized to form a polymer containing 3 kinds of microstructures, i.e. cis-1,4-structure, trans-1,4-structure and 1,2-structure. According to the studies of Natta et al., however, not only has it been clarified that when 1,3-butadiene is polymerized in the presence of a catalyst composed of vanadium acetylacetonate or chromium acetylacetonate and triethylaluminum or a catalyst composed of tetraalkoxymethane and triethylaluminum, for example, there is obtained a polybutadiene which contains about 50 mole percent to substantially 100 mole percent of 1,2-structure and which contains a relatively small amount or substantially nothing of cis-1,4-structure and trans-1,4-structure, but such polybutadiene has also come to be produced on a commercial scale. The present invention uses such polybutadiene having many side chain vinyl groups.

The reaction of the above-mentioned polybutadiene having a high 1,2-structure content with the mercapto-organosilane represented by the aforesaid general formula is carried out in such an inert solvent as toluene, benzene, ethyl alcohol or n-hexane, either at an elevated temperature and/or in the presence of such a radical catalyst as azobisisobutyronitrile, benzoyl peroxide, cumene hydroperoxide, peracetic acid, ammonium persulfate or potassium persulfate. It has been found that in the above reaction, the mercapto-organosilane adds substantially quantitatively to the side chain vinyl groups of the polybutadiene, and even if the main chain has double bonds derived from the cis-1,4-structure and trans-1,4-structure, the mercapto-organosilane scarcely reacts with said double bonds. The reaction of the above-mentioned polybutadiene having a high 1,2-structure content with such a thiol compound as mercapto-organosilane is explained in detail in Japanese Patent Application No. 61,567/68 on an invention by the same inventors as the present ones.

In the present invention, not all the side chain vinyl groups possessed by the polybutadiene having a high 1,2-structure content are required to be added to by the mercapto-organosilane of the aforesaid general formula, but may be left as unreacted vinyl groups. In the latter case, the unreacted side chain vinyl groups are vinyl-polymerized with the unsaturated polyester to form a crosslinkage. It may therefore be said that the latter case is rather preferable for the present invention. In case all the side chain vinyl groups of the polybutadiene having a high 1,2-structure content have reacted with the mercapto-organosilane, no linkage of the vinyl groups to the unsaturated polyester is, of course, formed. Even in this case, however, sufficient bonding can be attained owing to the affinity of the polybutadiene chain to the polyester, and when double bonds derived from the cis-1,4-structure and trans-1,4-structure are present in the main chain, owing to both said affinity and the polymerization between said double bonds and the unsaturated polyester.

In producing, in accordance with the present invention, a reinforced plastic from a glass fiber and an unsaturated polyester resin, the addition reaction product of the above-mentioned polybutadiene having a high 1,2-structure content with the mercapto-organosilane may be applied in the form of a solution or emulsion to the glass fiber according to an ordinary procedure. After drying, the thus treated glass fiber may be impregnated with the unsaturated polyester resin containing a catalyst. Alternatively, the glass fiber may be impregnated with a mixture comprising the above-mentioned reaction product, a catalyst and the unsaturated polyester resin (integral method). After impregnation with the resin, the glass fiber is heated and pressed according to an ordinary procedure to cure the unsaturated polyester resin, whereby a glass fiber-reinforced plastic is obtained.

In case, in the above-mentioned process, the addition reaction product is desired to be used in the form of a solution, such an ordinary organic solvent as benzene, toluene, acetone or methyl ethyl ketone is used as the solvent. According to the solution process, however, there are brought about various disadvantages in the handling of solvent, the recovery of solvent and the increase in cost due to the use of solvent. Ordinarily, therefore, the addition reaction product is used in the form of an aqueous emulsion. Such emulsion is prepared by dissolving the said reaction product in the above-mentioned solvent, emulsifying the resulting solution with a suitable emulsifier, e.g. a nonionic surface active agent such as "Hymal 101" (a trademark of Matsumoto Yushi Co., Ltd. for polyethylene derivative of alkylphenol) in a conventional manner, and diluting the emulsion with water. The reaction product content in the emulsion is preferably from 0.5 to 1.5% by weight.

As the curing catalyst for the unsaturated polyester resin, there is used any known curing catalysts such as, for example, benzoyl peroxide and dicumyl peroxide. In the case of the benzoyl peroxide, the added amount thereof is preferably less than 2% by weight.

When the glass fiber is treated directly with the aforesaid reaction product (in the form of a solution or emulsion), more favorable results can, in general, be obtained than in the integral method. In this case, the preferable amount of the reaction product adhered to the glass fiber is generally in the range of from 0.05 to 1.0%, preferably 0.1 to 0.5% by weight based on the weight of the glass fiber. In the case of the integral method, in general, the reaction product is preferably added in an amount of 0.5 to 5.0% by weight based on the weight of the unsaturated polyester resin, though 7% by weight or more and 0.3% or less of the reaction product may be added in some cases. The abovementioned amount of the reaction product adhered or added should be determined considering the content of 1,2-structure in polybutadiene and the proportion of said mercapto-organosilane added to the side chain vinyl group of said polybutadiene. For example, when the 1,2-structure content of polybutadiene is 80 mole percent and the molar ratio of the mercapto-organosilane added thereto to the polybutadiene is about 1:3, it is most preferable that the reaction product is adhered in a proportion of 0.1 to 0.5% by weight of the glass fiber in said direct treatment method and is added in a proportion of 0.5 to 1.25% by weight of the unsaturated polyester resin in the integral method.

On the other hand, the proportion of said mercapto-organosilane added to the polybutadiene having a high 1,2-structure content can greatly be varied depending upon the 1,2-structure content and the amount of the reaction product adhered or added. For instance, said mercapto-organosilane can be added to a polybutadiene containing about 50 mole percent of 1,2-structure at the maximum molar ratio of the former to the latter of 1:2 (100% based on the side chain vinyl group of the polybutadiene). In this case, when a suitable amount of the reaction product adhered to glass fiber (a suitable added amount in the case of integral method) is selected, the desired effect can be obtained even when the molar proportion of the mercapto-organosilane added to the polybutadiene is as small as less than 1:5. Where the 1,2-structure content is higher, generally speaking, the molar proportion of the mercapto-organosilane added to the polybutadiene may be smaller, though a higher proportion may, of course, be used. For example, when the polybutadiene contains substantially 100 mole percent of 1,2-structure, the selection of a suitable amount of the reaction product adhered to glass fiber or a suitable amount of the reaction product added to the unsaturated polyester resin enables the desired effect to be obtained even when the molar proportion of the mercapto-organosilane added to the polybutadiene is as small as less than 1:10 or as high as more than 4:5.

In the present invention, the unsaturated polyesters, which are also called polyester resins, are based on macromolecules having a polyester backbone in which a saturated acid, such as phthalic, isophthalic, adipic or azelaic acid and an unsaturated acid such as maleic or fumric acid, are both condensed with a dihydric alcohol. A three-dimensional structure is formed by cross-linking said polyester backbone, through the unsaturated acid component, with a vinyl monomer, most commonly styrene.

In the present invention, as the glass fiber, there are used commercially available ones.

Thus, in accordance with the present invention, the reaction product of polybutadiene with mercapto-organosilane is used to make it possible to produce an excellent reinforced plastic, i.e. a reinforced plastic high in strength and favorable in transparency, by reacting merely a small amount of the expensive organosilane compound with the polybutadiene.

Figure 2:
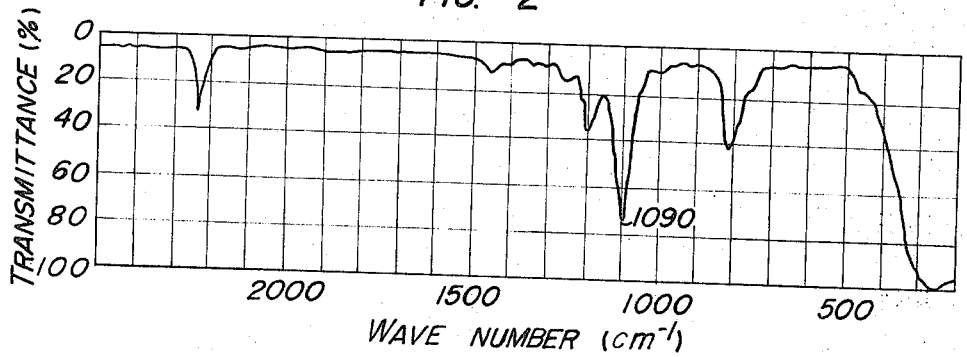
Figure 3:
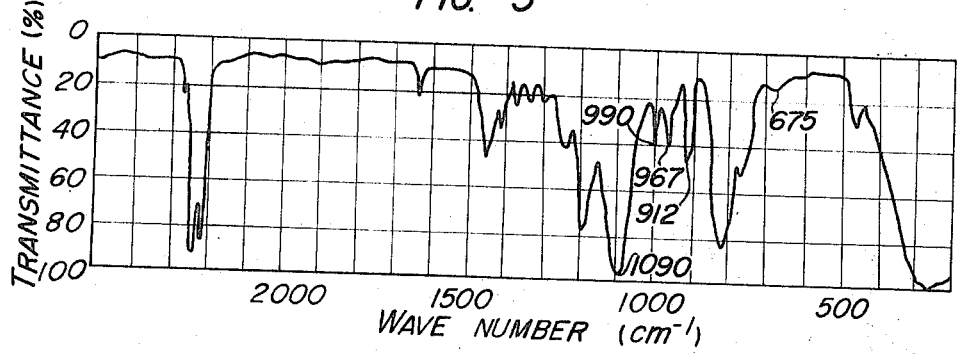
Figure 4:
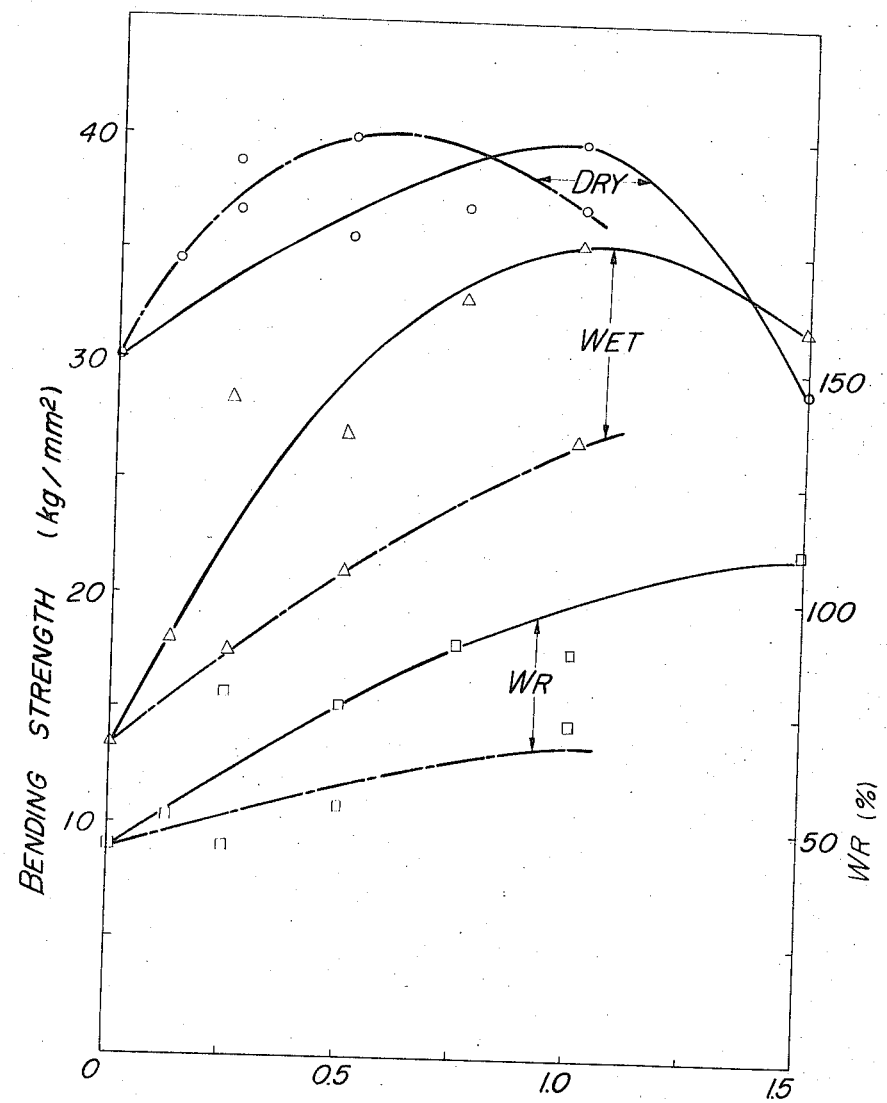
Figure 5:
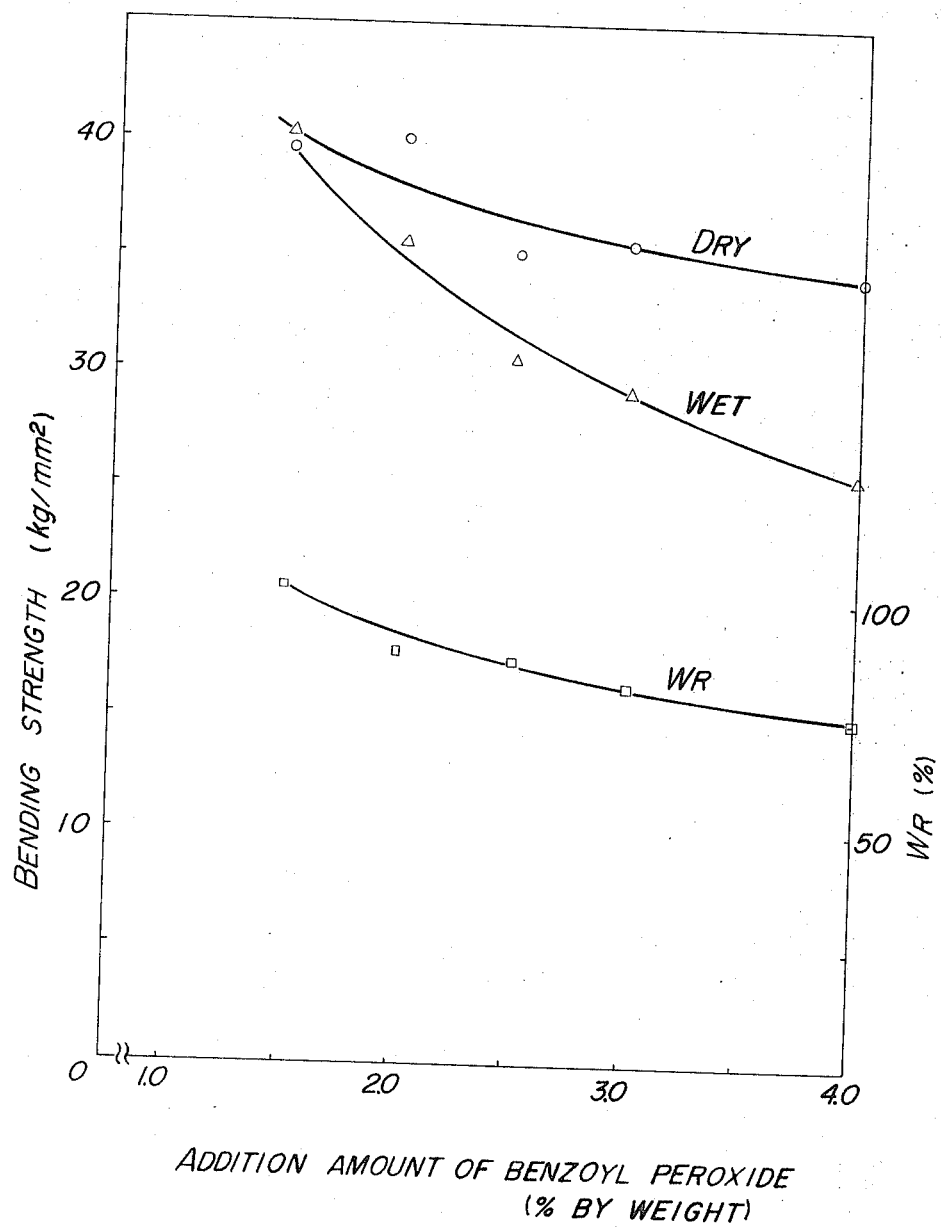
Figure 6:
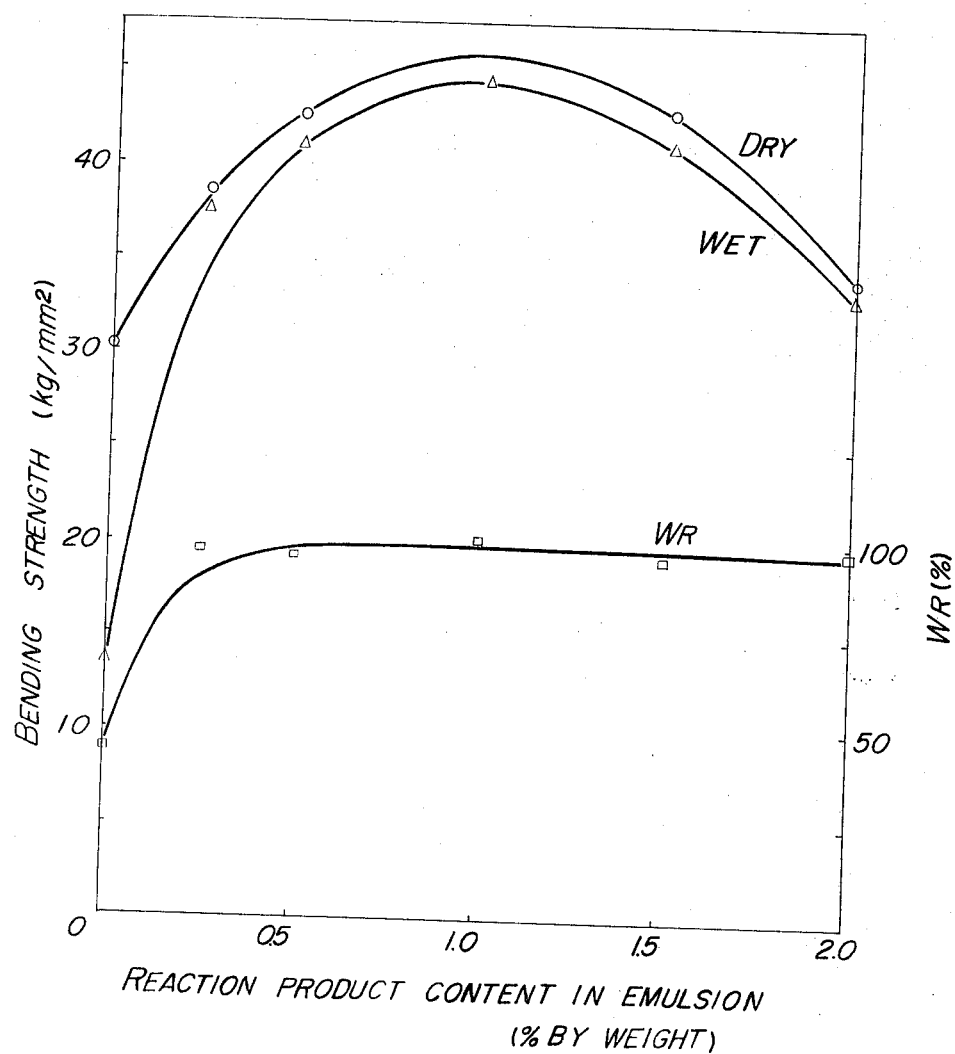

In the accompanying drawings, FIG. 1 is an infrared absorption spectrum of polybutadiene; FIG. 2 is an infrared absorption spectrum of γ-mercaptopropyltrimethoxysilane; FIG. 3 is an infrared absorption spectrum of the reaction product of polybutadiene with γ-mercaptopropyl-trimethoxysilane obtained in Example 1; FIG. 4 is a graph showing a relationship between the addition amount, based on the amount of unsaturated polyester resin, of the reaction product of polybutadiene with γ-mercaptopropyl-trimethoxysilane and the bending strength of the reinforced plastic obtained; FIG. 5 is a graph showing a relationship between the addition amount, based on unsaturated polyester resin, of benzoyl peroxide and the bending strength of the reinforced plastic obtained; and FIG. 6 is a graph showing a relationship between the content of the reaction product of polybutadiene with γ-mercaptopropyl-trimethoxysilane in the emulsion and the bending strength of the reinforced plastic obtained.

The present invention is explained in detail below with reference to Examples, which are by way of illustration and not by way of limitation.

EXAMPLE 1

To a solution in 500 ml. of benzene of 162 g. (3 moles) of a polybutadiene having a polymerization degree of 20 and containing 80 mole percent of 1,2-structure, 13 mole percent of trans-structure and 7 mole percent of cis-structure was added 1.64 g. (1 mole percent) of azobisisobutyronitrile. To the resulting mixture was added with stirring 196.3 g. (1 mole) of γ-mercaptopropyl-trimethoxysilane, and the mixture was subjected to reaction at normal temperature for 4 hours. Subsequently, the mixture was subjected to reaction at 40° C. for 12 hours, after which 0.82 g. (0.5 mole percent) of azobisisobutyronitrile was added to the mixture and the resulting mixture was further subjected to reaction at 60° C. for 24 hours. After completion of the reaction, the reaction liquid was allowed to cool to room temperature, and then the benzene was removed by distillation under reduced pressure. Thereafter, the residue was dried under a pressure of 2 to 3 mm. Hg to obtain a gelatinous reaction product. The conversion of the γ-mercaptopropyl-trimethoxysilane was substantially quantitative.

Infrared absorption spectra of the starting polybutadiene and γ-mercaptopropyl-trimethoxysilane used in the above reaction and of the reaction product were as shown in the accompanying drawings, FIGS. 1, 2 and 3, respectively. In FIG. 3, which shows the infrared absorption spectrum of the reaction product, it is recognized that the absorptions at 912 cm.$^{-1}$ and 990 cm.$^{-1}$ derived from the 1,2-structure, which are seen in FIG. 1 showing the infrared absorption spectrum of the polybutadiene, were greatly decreased, whereas the absorption at 967 cm.$^{-1}$ derived from the trans-structure and the absorption at 675 cm.$^{-1}$ derived from the cis-structure were left without any substantial change, and that the absorption at 1090 cm.$^{-1}$ of Si—O stretch resulting from Si—O—C, which is seen in FIG. 2 showing the infrared absorption spectrum of γ-mercaptopropyl-trimethoxysilane, has become strong. From this, it is understood that the γ-mercaptopropyl-trimethoxysilane has reacted chiefly with the side chain vinyl groups of the polybutadiene.

The elementary analysis values of the reaction product obtained were C: 60.64%, H: 9.58% and S: 8.71%. This indicates that the molar ratio of the γ-mercaptopropyltrimethoxysilane to the polybutadiene was about 1 to 3.

The thus obtained reaction product of polybutadiene with γ-mercaptopropyl-trimethoxysilane and benzoyl peroxide (2.0% by weight) were mixed with an unsaturated polyester resin ("Rigolac 1557", a trademark of Riken Gosei Co. for a mixture of styrene and a condensation product of isophthalic anhydride and succinic anhydride with ethylene glycol). The resulting mixture was used to impregnate glass fiber cloths (produced by Nitto Boseki Co.; Commodity No. ECG 181 BH), and 12 sheets of the resin-impregnated cloths were laminated each other. Subsequently, the laminate was squeezed and adjusted to a thickness of 3 mm. by use of a spacer, and pre-cured by means of a hot press at 80° C. for 1 hour under a pressure of 30 kg./cm.$^2$ and then after-cured at 100° C. for 1 hour to obtain a reinforced plastic high in strength and favorable in transparency. The relation (solid line) between the dry bending strength, wet bending strength (after boiling the test piece for 2 hours) and wet bending strength retention ratio (W.R.) (Wet bending strength/Dry bending strength×100) of the thus obtained reinforced plastic and the addition amount (weight percent) of the aforesaid reaction product is shown in FIG. 4, in which is also shown by the chain line, for comparison, the same relation as above of a reinforced plastic obtained in the same manner as above, except that vinyl-tris-(2-methoxyethoxy)silane, which was well known as a glass fiber surface-treating agent for production of reinforced plastics, was mixed with the unsaturated polyester resin. The bending strength was measured according to the method regulated in JIS K-16911.

According to FIG. 4, the maximum strength is attained when the above-mentioned reaction product is added in an amount of 1% by weight. In the case where the vinyl-tris(2-methoxyethoxy)silane is added, the resulting plastic is substantially identical in dry bending strength with the reinforced plastic of the present invention, but is far lower in wet bending strength than the present plastic and hence is extremely lower in wet bending strength retention ratio.

EXAMPLE 2

To an unsaturated polyester resin ("Rigolac 1557") were added 1% by weight of the same addition reaction product as in Example 1 and a variable amount of benzoyl peroxide. The resulting mixture was used to impregnate the same glass fiber cloths (ECG 181 BH) as in Example 1, which were then laminated and cured to obtain a reinforced plastic. The relation between the dry bending strength, wet bending strength and wet bending strength retention ratio of the reinforced plastic and the addition amount of the benzoyl peroxide is shown in FIG. 5.

According to FIG. 5, it is understood that the smaller the addition amount of benzoyl peroxide, the more favorable the results obtained, and that it is not preferable to add the benzoyl peroxide in an amount of more than 2% by weight.

EXAMPLE 3

The same addition reaction product as in Example 1 was dissolved in benzene to prepare a 40 wt. percent solution of the reaction product. To this solution, 10% by weight of a nonionic active agent ("Hymal 101", a tradename of Matsumoto Yushi Co.) was added to emulsify the reaction product. The resulting emulsion dope was diluted with water to form a glass fiber-treating emulsion.

Glass fiber cloths (ECG 181 BH) were immersed (pick up 30 wt. percent) in the treating emulsion prepared in the above manner, and then dried in air. The thus treated glass fiber cloths were impregnated with an unsaturated polyester resin ("Rigolac 1557") containing 2.0% of benzoyl peroxide, and then 12 sheets of the resin-impregnated cloths were laminated each other. Subsequently, the laminate was squeezed and adjusted to a thickness of 3 mm. by use of a spacer, and then cured in the same manner as in Example 1 to obtain a reinforced plastic high in strength and favorable in transparency. The relation between the dry bending strength, wet bending strength and wet bending strength retention ratio of the reinforced plastic and the reaction product content in emulsion is shown in FIG. 6.

According to FIG. 6, a high bending strength of more than about 40 kg./mm.$^2$ is attained when the reaction product content is about 0.5 to 1.5% by weight, and the maximum bending strength is obtained when said content is about 1% by weight. Further, when the reaction product content is more than about 0.25% by weight, the difference between the dry and wet strengths is only 2 to 5% and an extremely high wet bending strength retention ratio can be attained. When these results are compared with the results of Example 1 (FIG. 4), it is understood that the process of this example, in which the glass fiber cloths are directly treated, gives more favorable results.

A reinforced plastic, which is obtained by treating the above-mentioned glass fiber cloths with vinyl-tris(2-methoxyethoxy)silane so that the amount of said compound adhered to the cloths becomes 0.5% by weight, impregnating the thus treated cloths with the same unsaturated polyester resin as above, laminating the resin-impregnated cloths and then curing the resulting laminate, has a dry bending strength of 39.4 kg./mm.$^2$ and a wet bending strength of 35.6 kg./mm.$^2$, and thus is lower particularly in wet bending strength than the reinforced plastic of the present invention.

EXAMPLE 4

162 Grams (3 moles) of the same polybutadiene as in Example 1 was reacted in the same manner as in Example 1 with 353.3 g. (1.8 moles) of γ-mercaptopropyl-trimethoxysilane to obtain in a substantially quantitative yield a reaction product in which the γ-mercaptopropyl-trimethoxysilane had been added to the polybutadiene in a molar ratio of about 3:5.

Subsequently, 1.0% by weight of the thus obtained reaction product and 2.0% by weight of benzoyl peroxide were mixed with an unsaturated polyester resin ("Regolac 1557"). The resulting mixture was used to impregnate glass fiber cloths (ECG 181 BH) in the same manner as in Example 1, and the resin-impregnated cloths were laminated each other and then cured to obtain a reinforced plastic having a dry bending strength of 42 kg./mm.$^2$ and a wet bending strength of 41 kg./mm.$^2$ and favorable in transparency.

EXAMPLE 5

162 Grams of the same polybutadiene as in Example 1 was reacted in the same manner as in Example 1 with 294.5 g. (1.5 moles) of γ-mercaptopropyl-triethoxy-silane to obtain in a substantially quantitative yield a reaction product in which the γ-mercaptopropyl-triethoxysilane had been added to the polybutadiene in a molar ratio of about 1:2. This reaction product was dissolved in the same manner as in Example 3, emulsified with "Hymal 101" and then diluted with water to prepare a glass fiber-treating emulsion.

Subsequently, glass fiber cloths (ECG 181 BH) were immersed in the same manner as in Example 3 in the thus prepared emulsion and then dried to obtain treated glass fiber cloths to which had been adhered 0.3% of the aforesaid reaction product. In the same manner as in Example 3, the treated glass fiber cloths were impregnated with an unsaturated polyester resin ("Rigolac 1557") containing 2% by weight of benzoyl peroxide, and the resulting resin-impregnated cloths were laminated and cured to obtain a reinforced plastic having a dry bending strength of 46 kg./mm.$^2$ and a wet bending strength of 45 kg./mm.$^2$ and favorable in transparency.

EXAMPLE 6

In the same manner as in Example 1, 3 moles of a polybutadiene having a degree of polymerization of 50 and containing 80 mole percent of 1,2-structure, 15 mole percent of trans-structure and 5 mole percent of cis-structure was reacted with 1.5 moles of γ-mercaptopropyl-trimethoxysilane to obtain substantially quantitatively a reaction product in which γ-mercaptopropyl-trimethoxysilane was added to the polybutadiene in a ratio of about ½ moles of the former per mole of the latter.

The thus obtained reaction product and benzoyl peroxide (2.0% by weight) were mixed with the same unsaturated polyester resin as in Example 1, and in the same manner as in Example 1, 12 sheets of glass fiber cloths were impregnated with the resulting mixture, laminated each other and then cured. The results obtained were as follows:

| Amount of reaction product mixed (percent) | 0 | 0.5 | 1.0 |
|---|---|---|---|
| Dry bending strength (kg./mm.$^2$) | 30.0 | 39.0 | 40.0 |
| Wet bending strength (kg./mm.$^2$) | 13.5 | 36.5 | 38.8 |
| Wet bending strength retention ratio (percent) | 45.0 | 93.6 | 97.0 |

EXAMPLE 7

In the same manner as in Example 1, 3 moles of a polybutadiene having a degree of polymerization of 80 and containing 82 mole percent of 1,2-structure, 13 mole percent of trans-structure and 5 mole percent of cis-structure was reacted with 1 mole of γ-mercaptopropyl-trimethoxysilane to obtain a reaction product in which about ⅓ mole of said silane was added to 1 mole of said polybutadiene.

In the same manner as in Example 4, the thus obtained reaction product was dissolved in benzene, emulsified and then diluted with water to prepare an emulsion containing 1% by weight of said reaction product.

In the thus obtained emulsion were immersed the same glass fiber cloths as in Example 1, and then dried to obtain glass fiber cloths having adhered thereto 0.27% of said reaction product. The thus treated glass fiber cloths were, in the same manner as in Example 3, impregnated with the same unsaturated polyester resin, as used in Example 1 laminated and then cured. The results obtained were as follows:

| | Blank | Emulsion-treated |
|---|---|---|
| Dry bending strength (kg./mm.$^2$) | 30.0 | 43.0 |
| Wet bending strength (kg./mm.$^2$) | 13.5 | 42.7 |
| Wet bending strength retention ratio (percent) | 45.0 | 99.3 |

EXAMPLE 8

In the same manner as in Example 1, 3 moles of a polybutadiene having a degree of polymerization of 20 and containing 60 mole percent of 1,2-structure, 30 mole percent of trans-structure and 10 mole percent of cis-structure was reacted with 1.5 moles of γ-mercaptopropyl-trimethoxysilane to obtain a reaction product in which said silane was added to said polybutadiene in a molar ratio of about 1:2.

The thus obtained reaction product and benzoyl peroxide (2.0% by weight) were mixed with the same unsaturated polyester resin, and in the same manner as in Example 1, glass fiber cloths (ECG 181 BH) were impregnated with the resulting mixture, laminated and then cured. The results obtained were as follows:

| Amount of reaction product mixed (percent) | 0 | 0.5 | 1.0 |
|---|---|---|---|
| Dry bending strength (kg./mm.²) | 30.0 | 37.0 | 39.7 |
| Wet bending strength (kg./mm.²) | 13.5 | 36.2 | 38.5 |
| Wet bending strength retention ration (percent) | 45.0 | 97.8 | 97.0 |

EXAMPLE 9

In the same manner as in Example 3, an emulsion for treating glass fiber cloths containing 0.5% by weight or 1% by weight of the same reaction product as in Example 8 was prepared, and with this emulsion were treated the same glass fiber cloths to obtain treated glass fiber cloths in which 0.26% by weight or 0.3% by weight of said reaction product was adhered to the glass fiber. The thus obtained treated glass fiber cloths were then impregnated with the same unsaturated polyester resin as used in Example 1 in the same manner as in Example 3, laminated and then cured. The results obtained were as follows:

| Proportion of reaction product adhered (percent) | 0.26 | 0.30 |
|---|---|---|
| Dry bending strength (kg./mm.²) | 41.3 | 42.6 |
| Wet bending strength (kg./mm.²) | 40.7 | 42.3 |
| Wet bending strength retention ratio (percent) | 98.5 | 99.3 |

EXAMPLE 10

In the same manner as in Example 1, 4 moles of a polybutadiene having a degree of polymerization of 20 and containing 95 mole percent of 1,2-structure and 5 mole percent of trans-structure was reacted with 1 mole of γ-mercaptopropyl-trimethoxysilane to obtain a reaction product in which said silane was added to said polybutadiene in a molar ratio of about 1:4.

The thus obtained reaction product and benzoyl peroxide (2.0% by weight) were mixed with the same unsaturated polyester resin as in Example 1, and with the resulting mixture were impregnated glass fiber cloths (ECG 181 BH) in the same manner as in Example 1, laminated and then cured. The results obtained were as follows:

| Amount of reaction product mixed (percent) | 0.5 | 1.0 |
|---|---|---|
| Dry bending strength (kg./mm.²) | 37.2 | 40.5 |
| Wet bending strength (kg./mm.²) | 35.8 | 38.7 |
| Wet bending strength retention ration (percent) | 96.2 | 95.6 |

EXAMPLE 11

In the same manner as in Example 3, an emulsion containing 0.5% or 1.0% by weight of the same reaction product as in Example 10 was prepared, and with the thus obtained emulsion were treated the same glass fiber cloths as in Example 1 to obtain treated glass fiber cloths in which 0.26% or 0.3% by weight of the reaction product was adhered to the glass fiber. The thus obtained treated glass fiber cloths were impregnated with the same unsaturated polyester resin, as used in Example 1 laminated and then cured in the same manner as in Example 3. The results obtained were as follows:

| Proportion of reaction product adhered (percent) | 0.26 | 0.30 |
|---|---|---|
| Dry bending strength (kg./mm.²) | 40.8 | 43.5 |
| Wet bending strength (kg./mm.²) | 40.0 | 42.8 |
| Wet bending strength retention ratio (percent) | 98.0 | 98.4 |

EXAMPLE 12

In the same manner as in Example 1, 3 moles of the same polybutadiene as in Example 1 was reacted with 1.5 moles of β-mercaptoethyl-triethoxysilane to obtain a reaction product in which said silane was added to said polybutadiene in a molar ratio of about 1:2.

The thus obtained reaction product (1.0% by weight) and benzoyl peroxide (2.0% by weight) were mixed with the same unsaturated polyester resin as in Example 1, and with the resulting mixture were impregnated glass fiber cloths (ECG 181 BH), laminated and then cured in the same manner as in Example 1, to obtain a reinforced plastic having a dry bending strength of 39.4 kg./mm.² and a wet bending strength of 38.8 kg./mm.².

What is claimed is:

1. A glass fiber-reinforced plastic which comprises a glass fiber, an unsaturated polyester resin and an amount sufficient to bond said glass fiber and said polyester of a reaction product of a polybutadiene having a high, 1,2-structure content with a mercapto-organosilane represented by the general formula,

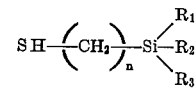

wherein $R_1$, $R_2$ and $R_3$, which may be same or different, are individually a hydrolyzable group capable of reacting with glass fiber, and $n$ is an integer of 1 to 4, the molar ratio of said polybutadiene to said mercapto-organosilane in the reaction product being about 10:1 to 10:8, said reaction product being present at the interface between said glass fiber and the unsaturated polyester resin being cured.

2. A reinforced plastic according to Claim 1, wherein the 1,2-structure content in the polybutadiene is about 50 mole percent to substantially 100 mole percent.

3. A reinforced plastic according to Claim 1, wherein the reaction product has unreacted side chain vinyl groups.

4. A reinforced plastic according to Claim 1, wherein the mercapto-organosilane is
mercaptomethyl-trimethoxysilane,
β-mercaptoethyl-trimethoxysilane,
β-mercaptoethyl-triethoxysilane,
β-mercaptoethyl-tripropyloxysilane,
β-mercaptoethyl-trichlorosilane,
β-mercaptoethyl-tribromosilane,
γ-mercaptopropyl-trimethoxysilane,
γ-mercaptopropyl-triethoxysilane,
γ-mercaptopropyl-trimethoxyethoxysilane,
γ-mercaptopropyl-triacetoxysilane,
γ-mercaptopropyl-trichlorosilane,
γ-mercaptopropyl-triiodosilane or
δ-mercaptobutyl-ethoxysilane.

5. A reinforced plastic according to Claim 1, wherein the reaction product is adhered to the glass fiber in an amount of 0.1 to 0.5% by weight based on the weight of said fiber.

6. A reinforced plastic according to Claim 1, wherein $R_1$, $R_2$ and $R_3$ are selected from the group consisting of alkoxy groups, acetoxy groups and halogens.

7. A process for producing a glass fiber-reinforced plastice which comprises applying to a glass fiber a reaction production in an amount of 0.05 to 1.0% by weight of said reaction product based on the weight of said glass fiber, either in the form of a solution or emulsion, of a polybutadiene having a high 1,2-structure content with a mercapto-organosilane represented by the general formula,

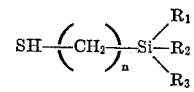

wherein $R_1$, $R_2$ and $R_3$, which may be same or different, are individaully a hydrolyzable group capable of reacting with glass fiber, and $n$ is an integer of 1 to 4, the molar ratio of said polybutadiene to said mercapto-organosilane in the reaction product being about 10:1 to 10:8, drying the glass fiber, impregnating the thus treated glass fiber with an unsaturated polyester resin containing a catalyst, and then curing the resin.

8. A process according to Claim 7, wherein the unsaturated polyester resin contains less than 3% by weight of benzoyl peroxide as the catalyst.

9. A process according to Claim 7, wherein the reaction product is adhered to the glass fiber in an amount of 0.1 to 0.5% by weight based on the weight of said fiber.

10. A process according to Claim 7, wherein the polybutadiene contains about 50 mole percent to substantially 100 mole percent of 1,2-structure, and the molar ratio of polybutadiene to mercapto-organosilane in the reaction product is about 10:1 to 10:8.

11. A process for producing a glass fiber-reinforced plastic which comprises impregnating a glass fiber with a mixture of an unsaturated polyester resin; the reaction product, in an amount of 0.3 to 7% by weight of said reaction product based on the weight of an unsaturated polyester resin, of a polybutadiene having a high 1,2-structure content with a mercapto-organosilane represented by the general formula,

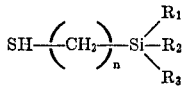

wherein $R_1$, $R_2$ and $R_3$, which may be same or different, are individually a hydrolyzable group capable of reacting with glass fiber, and $n$ is an integer of 1 to 4, the molar ratio of said polybutadiene to said mercapto-organosilane in the reaction product being about 10:1 to 10:8 and a catalyst; and then curing the same.

12. A process according to Claim 11, wherein the proportion of the reaction product based on the weight of the unsaturated polyester resin is 0.5 to 5.0% by weight.

13. A process according to Claim 11, wherein the polybutadiene contains about 50 mole percent to substantially 100 mole percent of 1,2-structure, and the molar ratio of polybutadiene to mercapto-organosilane in the reaction product is about 10:1 to 10:8.

References Cited
UNITED STATES PATENTS

| | | |
|---|---|---|
| 2,952,576 | 9/1960 | Wheelock et al. _ 117—126 GS X |
| 3,655,633 | 4/1972 | Saam _____ 260—46.5 G X |
| 3,350,345 | 10/1967 | Vanderbilt et al. _ 117—126 GS X |
| 3,376,188 | 4/1968 | Clozton et al. __ 117—126 GS X |
| 3,674,542 | 7/1972 | Vanderbilt et al. __ 117—126 GS |

MORRIS LIEBMAN, Primary Examiner

S. M. PERSON, Assistant Examiner

U.S. Cl. X.R.

117—126 GS; 260—46.5 G, 862